(12) United States Patent
Hammond

(10) Patent No.: US 9,200,821 B2
(45) Date of Patent: Dec. 1, 2015

(54) SOLAR COLLECTOR AND COOLING SYSTEM HAVING THE SAME

(71) Applicant: James Peter Hammond, Homestead, FL (US)

(72) Inventor: James Peter Hammond, Homestead, FL (US)

( * ) Notice: Subject to any disclaimer, the term of this patent is extended or adjusted under 35 U.S.C. 154(b) by 137 days.

(21) Appl. No.: 13/902,158

(22) Filed: May 24, 2013

(65) Prior Publication Data

US 2013/0255299 A1    Oct. 3, 2013

Related U.S. Application Data

(63) Continuation of application No. 12/926,380, filed on Nov. 15, 2010, now Pat. No. 8,448,458.

(51) Int. Cl.
| | | |
|---|---|---|
| *F25B 27/00* | (2006.01) | |
| *F24F 5/00* | (2006.01) | |
| *F24J 2/05* | (2006.01) | |
| *F24J 2/24* | (2006.01) | |
| *F24J 2/48* | (2006.01) | |
| *F24J 2/50* | (2006.01) | |
| *F24J 2/51* | (2006.01) | |
| *F24J 2/46* | (2006.01) | |
| *F28F 13/00* | (2006.01) | |

(52) U.S. Cl.
CPC ............ *F25B 27/005* (2013.01); *F24F 5/0014* (2013.01); *F24J 2/055* (2013.01); *F24J 2/248* (2013.01); *F24J 2/4652* (2013.01); *F24J 2/487* (2013.01); *F24J 2/507* (2013.01); *F24J 2/51* (2013.01); *F24F 2005/0064* (2013.01); *F24J 2/4647* (2013.01); *F28F 2013/006* (2013.01); *Y02E 10/44* (2013.01)

(58) Field of Classification Search
CPC ............ F24F 5/0014; F24F 2005/0064; F28F 2013/006; F24J 2/005; F24J 2/248; F24J 2/2487; F24J 2/507; F24J 2/51; F24J 2/4652; F24J 2/4647; F25B 27/005
USPC ........................ 62/235.1, 324.4; 126/447, 448
See application file for complete search history.

(56) References Cited

U.S. PATENT DOCUMENTS

| | | | |
|---|---|---|---|
| 3,964,678 A | | 6/1976 | O'Hanlon |
| 4,103,493 A | | 8/1978 | Schoenfelder |
| 4,134,392 A | * | 1/1979 | Livermore et al. ............ 126/657 |
| 4,169,554 A | | 10/1979 | Camp |
| 4,176,523 A | | 12/1979 | Rousseau |
| 4,187,687 A | | 2/1980 | Savage |
| 4,212,293 A | * | 7/1980 | Nugent ......................... 126/711 |
| 4,269,172 A | * | 5/1981 | Parker et al. .................. 126/621 |
| 4,277,946 A | | 7/1981 | Bottum |
| 4,285,211 A | | 8/1981 | Clark |

(Continued)

FOREIGN PATENT DOCUMENTS

| | | |
|---|---|---|
| CN | 1269494 | 10/2000 |
| CN | 200965312 | 10/2007 |

(Continued)

*Primary Examiner* — Mohammad M Ali
(74) *Attorney, Agent, or Firm* — Paratus Law Group, PLLC

(57) ABSTRACT

A solar air conditioning system and method of superheating working fluid is provided. The solar air conditioning system superheats the working fluid using radiant energy from the sun, and then delivers the working fluid as a superheated and higher-pressured gas to a condenser within the solar air conditioning system. The solar air conditioning system includes a solar collector within which the working fluid is superheated.

20 Claims, 5 Drawing Sheets

(56) References Cited

U.S. PATENT DOCUMENTS

| | | | |
|---|---|---|---|
| 4,299,203 A * | 11/1981 | Skopp | 126/638 |
| 4,308,723 A | 1/1982 | Ecker | |
| 4,327,555 A | 5/1982 | Dimon | |
| 4,351,161 A * | 9/1982 | Jones | 62/235.1 |
| 4,374,468 A | 2/1983 | Takeshita et al. | |
| 4,416,264 A | 11/1983 | Herrick et al. | |
| 4,474,170 A * | 10/1984 | McConnell et al. | 126/636 |
| 4,474,173 A * | 10/1984 | Ford | 126/676 |
| 4,483,322 A | 11/1984 | Mori | |
| 4,722,197 A * | 2/1988 | McEntire | 62/235.1 |
| 4,798,056 A * | 1/1989 | Franklin | 62/235.1 |
| 4,901,537 A | 2/1990 | Yoshikawa et al. | |
| 5,205,137 A | 4/1993 | Ohuchi et al. | |
| 5,943,868 A | 8/1999 | Dietz et al. | |
| 6,474,089 B1 * | 11/2002 | Chen | 62/235.1 |
| 6,513,339 B1 | 2/2003 | Kopko | |
| 6,675,601 B2 | 1/2004 | Ebara | |
| 6,819,465 B2 * | 11/2004 | Clikeman et al. | 359/247 |
| 7,631,515 B2 * | 12/2009 | Jacobi | 62/434 |
| 7,753,048 B2 | 7/2010 | Liu et al. | |
| 2002/0174671 A1 | 11/2002 | Wilkinson | |
| 2006/0011193 A1 * | 1/2006 | Rong | 126/651 |
| 2008/0022713 A1 * | 1/2008 | Jacobi | 62/434 |
| 2008/0047285 A1 | 2/2008 | Boule | |
| 2008/0092575 A1 | 4/2008 | Muscatell | |
| 2008/0148744 A1 * | 6/2008 | Al-Maaitah | 62/98 |
| 2008/0271731 A1 | 11/2008 | Winston | |
| 2009/0159076 A1 * | 6/2009 | Zheng | 126/615 |
| 2009/0235985 A1 * | 9/2009 | Lubart et al. | 136/259 |
| 2010/0043483 A1 * | 2/2010 | Jacobi | 62/434 |
| 2012/0023982 A1 * | 2/2012 | Berson et al. | 62/115 |

FOREIGN PATENT DOCUMENTS

| | | |
|---|---|---|
| WO | WO 01/79771 | 10/2001 |
| WO | WO 02/103260 | 12/2002 |
| WO | WO 2004/023045 | 3/2004 |

* cited by examiner ized and exemplary embodiment of the present invention may not overcome any of the problems described above.

SOLAR COLLECTOR AND COOLING SYSTEM HAVING THE SAME

This application is a continuation of pending U.S. patent application Ser. No. 12/926,380, filed Nov. 15, 2010, which is incorporated herein by reference in its entirety.

BACKGROUND OF THE INVENTION

1. Field of the Invention

Apparatuses and methods consistent with the present invention relate to superheating working fluid and delivering the superheated working fluid to a condenser of an air conditioning system, and more particularly, to using solar energy to superheat the working fluid prior to delivery to the condenser.

2. Description of the Related Art

Air conditioning systems on the market today use a compressor to compress a working fluid such as a refrigerant, packing the molecules of the working fluid closer together thus raising the energy and temperature of the working fluid. As shown in the related art air conditioning system (100) of FIG. 1, working fluid arrives at the compressor (101) as a cool, low-pressure gas. The compressor (101) is powered by electricity to mechanically squeeze the working fluid, and the squeezing results in packing the molecules of the working fluid closer together. The closer the molecules of the working fluid are together, the higher the working fluid's energy and temperature.

After compression, the working fluid leaves the compressor (101) as a hot, high-pressure gas and flows into a condenser (102). The gas enters the condenser (102) and begins cooling and changing back into a liquid at the bottom one-third of the coils of the condenser (102). When the working fluid leaves the condenser (102) as a semi liquid, its temperature is much cooler and its state has changed from a gas to a semi-liquid under high pressure. This semi-liquid is sent into an evaporator (104) through a metering device (103) that controls the dispensing rate of the semi-liquid working fluid to the evaporator (104). Within the evaporator (104), the semi-liquid's pressure drops and the semi-liquid begins to evaporate into a gas. As the semi-liquid changes to gas and evaporates, heat is extracted from the surrounding air. This heat is needed for separating the molecules of the working fluid in its transformation of state from semi-liquid to gas. By the time the working fluid leaves the evaporator (104), it is a cool, low-pressure gas. The working fluid then returns to the compressor (101) as the cool, low-pressure gas to begin this cycle all over again.

In the air conditioning system of FIG. 1, a fan (not shown) is used to discharge the hot air emanating from the coils of the condenser (102) to the outside, while cold air emanating from the coils of the evaporator (104) is blown into the space to be cooled.

Low temperature, low-pressure refrigerant as the working fluid is delivered to the compressor (101). Different refrigerants have different temperature points and characteristics when used in the related art air conditioning system (100). The related art air conditioning system (100) uses the compressor (101) to increase the pressure on the gaseous state working fluid, thus also heating the working fluid, and sends the heated working fluid to the condenser (102) where the working fluid becomes a semi-liquid after traveling through the coils of the condenser (102). As shown in FIG. 2, the working fluid in a hot, high-pressure gaseous state is forced into the top of the coils of the condenser (102) (i.e., the condenser/condensing coil) located outside. Air blowing across the coils condenses the working fluid from the gas into a semi-liquid state and in this conversion from gas to semi-liquid, heat is released into the outside air.

The change of state of the working fluid from gas to semi-liquid typically starts to occur approximately two-thirds of the way down the coils of the condenser (102). Thus, the related art air conditioning system (100) only changes a portion of the gas into a liquid state, so the working fluid is actually in the form of a saturated vapor (semi-liquid) when the working fluid enters into the metering device (103). The working fluid is delivered to the metering device (103) as a saturated vapor.

Although the size of the condenser (102) in the related art air conditioning system (100) may be increased in order to increase the pressure and temperature of the working fluid when compressed, it is not practical to use a super compressor or even an oversized condenser coil due to the expenditure of an excessive amount of electricity, high equipment cost and undesirable equipment size.

As shown in FIG. 3, the working fluid enters the metering device (103) and is sent to the evaporator (104) in a cold, semi-liquid state. Warm air from inside the house boils and vaporizes the cold working fluid and its state changes into a gas. When the working fluid boils, a lot of heat is absorbed in the process. This is called the latent heat of vaporization and makes for very efficient heat transfer. The working fluid is a good material for use in heat transfer due to its property of being a gas at atmospheric pressure, its ability to absorb a lot of heat when it boils and giving off a lot of heat when it condenses. The warm air from inside the house is drawn into and passed through the coils of the evaporator (104) where it cools, and the cooler air is then sent back into the house. As such, the evaporating of the semi-liquid state working fluid at a very low boiling point results in the removal of the heat from the warm air inside the house.

The related art air conditioning system (100) is designed to change only a relatively small portion of the gaseous state working fluid into the liquid state so that when the working fluid enters into the metering device (103) the working fluid is in the state of a saturated vapor (semi-liquid). In this related art air conditioning system (100), the compressor (101) is relied upon to deliver a volume of working fluid to the condenser (102) as a saturated vapor under high pressure. The volume of the working fluid in the related art air conditioning system (100) affects the capacity of the system for heat removal. The temperature and the pressure of the gaseous state working fluid entering the condenser (102) have a direct bearing on the characteristics of the working fluid at the output of the condenser (102), in that the hotter and higher-pressured the gas is at the input of the condenser (102), the colder and more transformed to liquid is the working fluid leaving the condenser (102). More specifically, the hotter the gas at the input of the condenser (102), the higher the percentage of gas being changed into liquid under high pressure.

However, the compressor (101) of the related art air conditioning system (100) is limited by the amount of pressurization that it can practically provide. As such, due to the limit on the provided pressure, the temperature of the working fluid exiting the compressor (101) is also limited to a relatively cool temperature.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

Aspects of the present invention relate to a solar air conditioning system that superheats a working fluid. According to an aspect of the present invention, the working fluid is delivered as a superheated and higher-pressured gas to a condenser within the solar air conditioning system.

According to another aspect of the present invention, the working fluid is superheated using radiant energy from the sun, and then delivered directly to the condenser.

According to another aspect of the invention, the working fluid is superheated using a solar collector. The solar collector may be constructed using at least one evacuated tube.

According to an exemplary embodiment of the present invention, there is provided a solar air conditioning system that includes a compressor, a solar collector, a condenser, and an evaporator.

According to another exemplary embodiment of the present invention, there is provided a solar air conditioning system that includes a compressor that compresses a working fluid, a solar collector coupled to the compressor, the solar collector heating the compressed working fluid, a condenser coupled to the solar collector, the condenser condensing the heated working fluid, and an evaporator coupled between the condenser and the compressor, the evaporator evaporating the condensed working fluid.

According to another exemplary embodiment of the present invention, the solar collector includes at least one evacuated tube that heats the compressed working fluid, wherein, the compressed working fluid is heated while flowing within an interior space of the at least one evacuated tube.

According to another exemplary embodiment of the present invention, the at least one evacuated tube receives radiant energy from the sun, generates heat from the radiant energy, and transfers the heat through a heat transfer fluid to the compressed working fluid flowing within the interior space of the at least one evacuated tube.

According to another exemplary embodiment of the present invention, a proper charge of the solar air conditioning system is obtained when a pressure P of the working fluid is balanced in accordance with the ideal gas law, PV=nRT, in which V is a volume of a sealed space within which the working fluid circulates, n is an amount of the working fluid present within the solar air conditioning system, R is the universal gas constant, and T is a temperature of the working fluid.

According to another exemplary embodiment of the present invention, there is provided a solar collector that includes an inlet pipe that receives a working fluid, at least one u-tube that receives at a first end the working fluid from the inlet pipe, an outlet pipe that receives the working fluid from a second end of the at least one u-tube, and at least one evacuated tube that heats the working fluid, wherein the working fluid is heated while flowing within an interior space of the at least one evacuated tube, and wherein the at least one u-tube is configured to extend within the interior space of the at least one evacuated tube.

According to another exemplary embodiment of the present invention, the interior space of the at least one evacuated tube is filled with a heat transfer fluid and the at least one u-tube is submerged within the heat transfer fluid.

According to another exemplary embodiment of the present invention, there is provided a method of circulating a working fluid in a closed loop within a solar air conditioning system, the method including compressing the working fluid by squeezing to pack molecules of the working fluid closer together, heating the compressed working fluid using radiant energy from the sun, condensing the heated working fluid by cooling and changing a state of the heated working fluid from a gas into a liquid, and evaporating the condensed working fluid by changing a state of the condensed working fluid from a liquid into a gas.

BRIEF DESCRIPTION OF THE DRAWINGS

The above and/or other aspects of the invention will become apparent and more readily appreciated from the following description of exemplary embodiments, taken in conjunction with the accompanying drawings, of which.

DETAILED DESCRIPTION OF EXEMPLARY EMBODIMENTS OF THE PRESENT INVENTION

Figure 1:
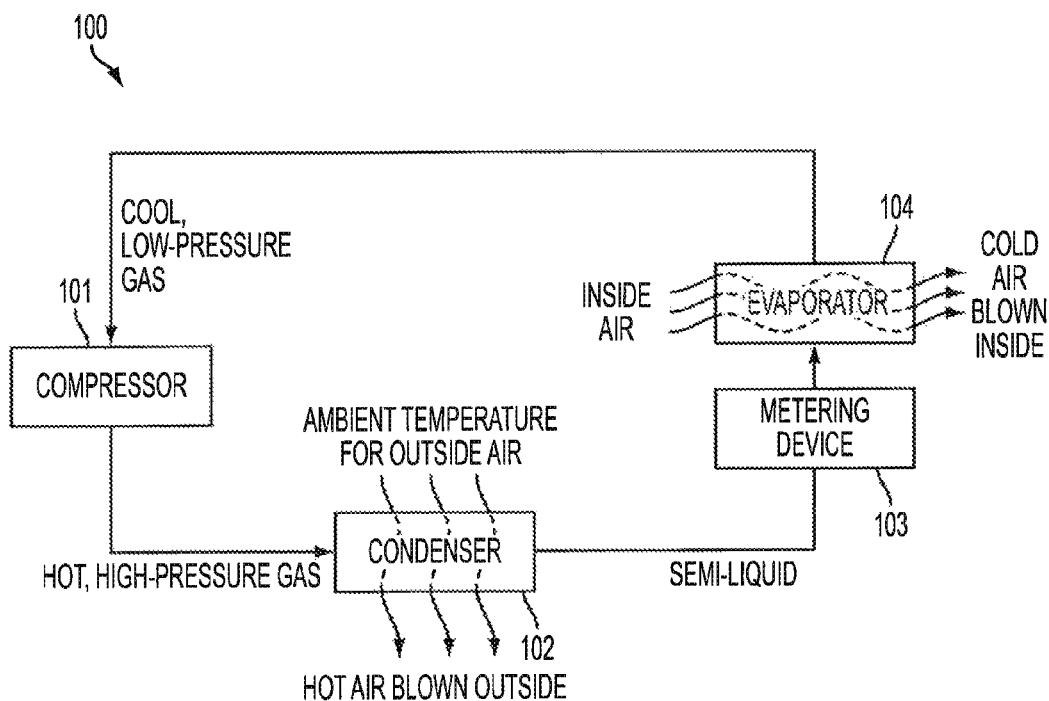
FIG. 1 is a block diagram of a related art air conditioning system.
Figure 2:
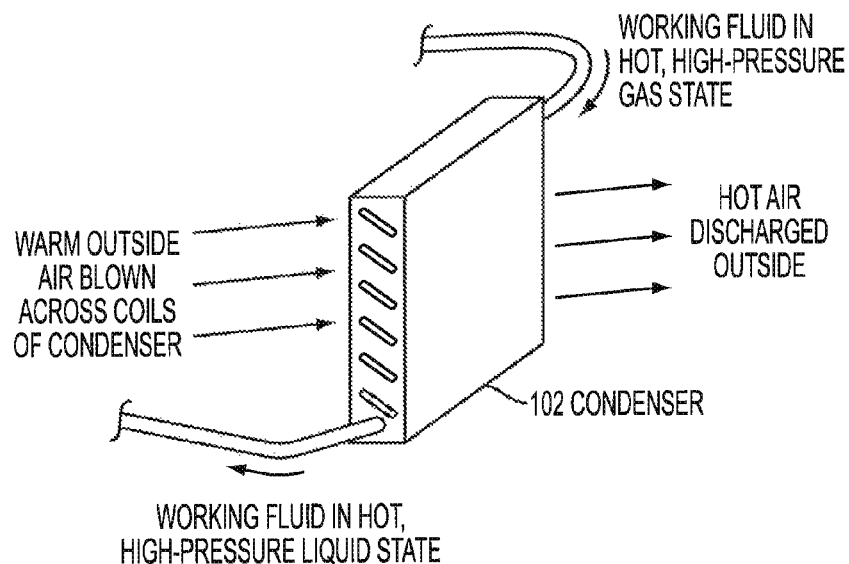
FIG. 2 is a more detailed view of the condenser of the related art air conditioning system of FIG. 1.
Figure 3:
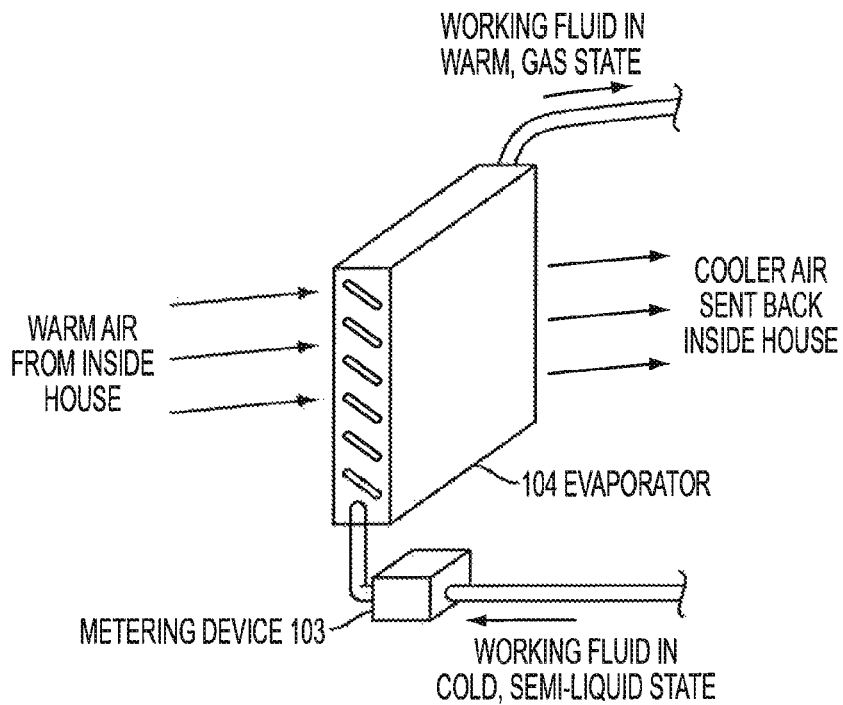
FIG. 3 is a more detailed view of the evaporator of the related art air conditioning system of FIG. 1.

Reference will now be made in detail to exemplary embodiments of the present invention, examples of which are illustrated in the accompanying drawings, wherein like reference numerals refer to like elements throughout. Exemplary embodiments are described below, in order to explain the present invention by referring to the figures.

Figure 4:
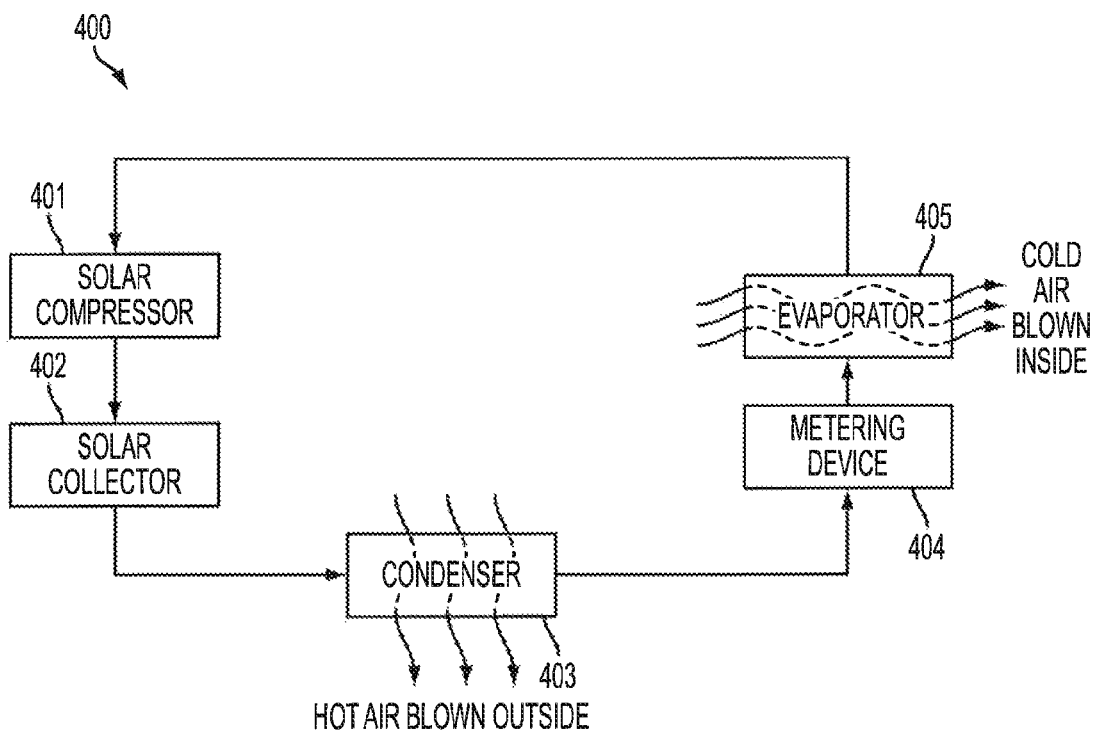
FIG. 4 is a block diagram of a solar air conditioning system according to an exemplary embodiment of the present invention.

FIG. 4 is a block diagram of a solar air conditioning system (400), according to an exemplary embodiment of the present invention. As shown in FIG. 4, working fluid arrives at the solar compressor (401) as a cool, low-pressure gas. The solar compressor (401) is powered by electricity to mechanically squeeze the working fluid, and the squeezing results in packing the molecules of the working fluid closer together. The closer the molecules of the working fluid are together, the higher the working fluid's energy and temperature.

After compression by the solar compressor (401), the working fluid leaves the solar compressor (401) as a hot, high-pressure gas and enters into a solar collector (402). The solar collector (402) superheats the working fluid, further increasing the temperature and pressure of the working fluid. In the solar collector (402), the temperature of the working fluid is increased by using the energy from the sun's radiation, and this absorbed heat in a closed loop environment produces pressure which compresses the working fluid into a superheated gas of high pressure. The working fluid in this state may be in the form of a high temperature vapor.

The working fluid leaves the solar collector (402) as a superheated gas of high-pressure, and flows into a condenser (403). The gaseous working fluid enters the condenser (403) and begins cooling and changing back into a liquid at the very top of the coils of the condenser (403). This accelerated condensation is possible due to the phenomenon that condensation, of the working fluid starts to occur quicker at high temperatures and pressures, and less heat removal is required for condensation at the higher temperatures and pressures. The higher temperature and pressure, and greater temperature difference between the coils of the condenser (403) and the ambient temperature, allow for a better heat exchange throughout the entire system of the solar air conditioning system (400).

In comparison, the temperature difference between the coils of the condenser (102) of the related art air conditioning system (100) and the ambient temperature is smaller, and the gaseous working fluid entering the condenser (102) is a lower temperature than the gaseous working fluid entering the condenser (403), and thus the gaseous working fluid in the condenser (102) only begins cooling and Changing back into a liquid at the bottom one-third of the coils of the condenser (102) in the related art air conditioning system (100). In the solar air conditioning system (400), the entire coil face of the condenser (403) is utilized in the condensing process, allowing for better heat exchange throughout the entire system.

When the working fluid leaves the condenser (403) as a semi-liquid, its temperature is much cooler and its state has changed from a gas to a liquid under high pressure. The working fluid leaving the condenser (403) is in a subcooled liquid state under compression. In the solar air conditioning system (400), because the working fluid is superheated by the solar collector (402), the working fluid is in a hotter, higher-pressured gas state when entering the condenser (403), and thus leaves the condenser (403) in a colder and more liquid state as compared to the process in the related art air conditioning system (100). Due to the increased temperature difference between the working fluid entering the condenser (403) and the ambient temperature, heat exchange is improved throughout the entire system of the solar air conditioning system (400), more of the working fluid is changed from a gas to a liquid by the condenser (403), and the colder and more liquidous state of the working fluid entering the evaporator (405) enables more heat and humidity to be removed in the evaporation process. For example, a 5° F. increase in temperature of the working fluid entering the condenser (403) results in approximately 20% more humidity removal in the solar air conditioning system (400).

In addition, the temperature of the working fluid leaving the evaporator (405) and entering the solar compressor (401) also becomes colder as compared to the temperature of the working fluid at the inlet of the compressor (101) of the related art air conditioning system (100). This is because the working fluid enters the evaporator (405) in the colder and more liquidous state.

Furthermore, the additional heating of the working fluid by the solar collector (402) reduces the work done by the solar compressor (401), such that the more energy the solar collector (402) transfers to the working fluid, the less the solar compressor (401) needs to work.

The working fluid in the liquidous state is then sent into an evaporator (405) through a metering device (404) that controls the dispensing rate of the subcooled working fluid to the evaporator (405). The metering device (404) may be any device that reduces and controls the pressure of the working fluid, such as a thermostatic expansion valve. Within the evaporator (405), the liquid's pressure drops further and the liquid begins to evaporate into a gas because the ambient temperature is higher than the working fluid's boiling temperature. As the liquid changes to gas and evaporates, heat is extracted from the surrounding air. This heat is needed for separating the molecules of the working fluid in its transformation of state from subcooled semi-liquid to gas. By the time the working fluid leaves the evaporator (405), it is a cool, low-pressure gas. The working fluid then returns to the solar compressor (401) as the cool, low-pressure gas to begin this cycle all over again.

By having two sources of heat and pressure (i.e., the solar compressor (401) and the solar collector (402)), more working fluid is present within the solar air conditioning system (400) as compared to the related art air conditioning system (100). The additional working fluid is added to fill the volume within the pipes and tubes of the solar collector (402). In the related art air conditioning system (100), the system is charged (i.e., the proper amount of working fluid refrigerant is added to the system) by using the superheat and subcooling methods. However, instead of superheat and subcooling, the solar air conditioning system (400) may be charged using the ideal gas law, in which the state of an amount of gas is determined by its pressure, volume and temperature, that is, $PV=nRT$, where P is the pressure of the working fluid (e.g., in units of psi), V is the volume of the sealed space within which the working fluid circulates, n is the amount of working fluid, R is the universal gas constant, and T is the temperature. The solar air conditioning system (400) is correctly charged once the pressure is balanced in accordance with the two sources of heat and pressure (i.e., with the solar compressor (401) and the solar collector (402)) and the total working fluid volume to equal the desired charge temperature. The pressure P may be measured from a point on the high-pressure side of the solar air conditioning system (400), that is, between the solar collector (402) and the condenser (403). As such, the temperature at the input of the condenser (403) can be controlled based on the setting of the pressure P (psi) of the working fluid at the high-pressure side.

When charging the solar air conditioning system (400), a psi charging table may be used. This psi charging table specifies the desired psi pressure of the working fluid at varying ambient temperatures, with the values of the psi charging table varying based on the working fluid being used. Accordingly, in an exemplary embodiment of the present invention, the solar air conditioning system (400) may be charged such that the pressure of the working fluid at the high-pressure side is set according to the psi charging table corresponding to the type of working fluid being used.

According to an exemplary embodiment of the present invention, the volume of working fluid in the solar air conditioning system (400), after proper charging, is larger than the volume of working fluid in the related art air conditioning system (100), as additional working fluid is required in order to fill the additional volume of piping and tubing added to the system due to the addition of the solar collector (402). This additional volume of working fluid is free fuel for heat removal, without having increased the capacity or the energy consumption of the compressor (401). The increased volume of working fluid in the solar air conditioning system (400) enables more heat removal when the system is in operation. The volume of working fluid present in the solar air conditioning system (400) according to an exemplary embodiment of the present invention may be significantly more than the volume of working fluid present in the related art air conditioning system (100).

Furthermore, although the solar air conditioning system (400) contains a larger volume of working fluid as compared to that of the related art air conditioning system (100), the working fluid in the solar air conditioning system (400) is under lower pressure, reducing the energy required by the solar compressor (401) to compress the working fluid.

Figure 5:
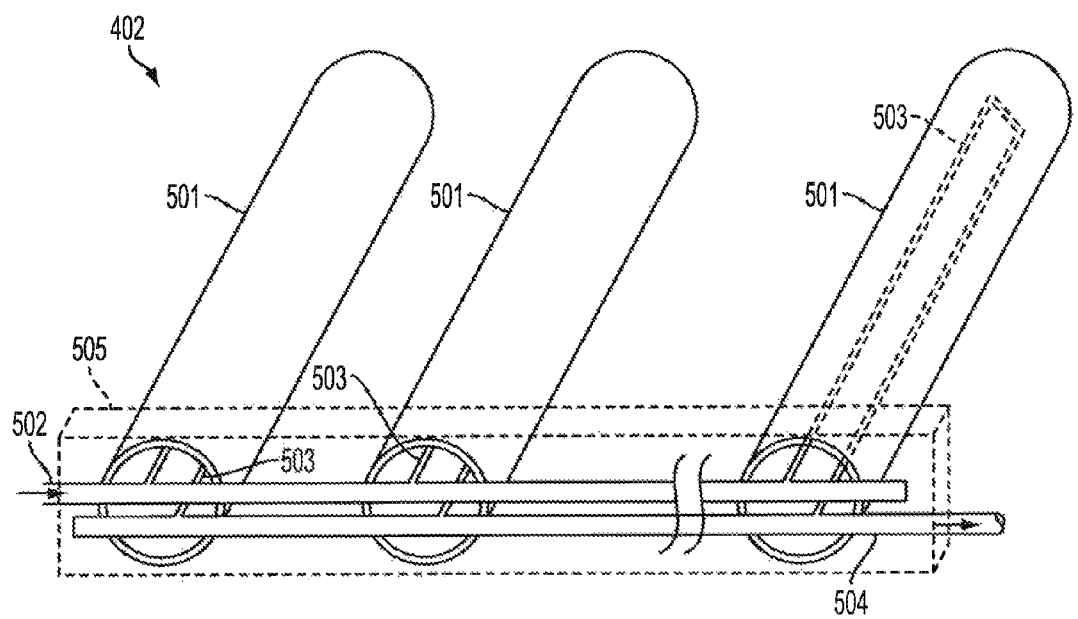
FIG. 5 is a detailed view of a solar collector according to an exemplary embodiment of the present invention.

FIG. 5 depicts the solar collector (402) in more detail, according to an exemplary embodiment of the present invention. As shown in FIG. 5, the solar collector (402) includes a plurality of evacuated tubes (501). An inlet pipe (502) receives the working fluid from the solar compressor (401), and the working fluid enters u-tubes (503) of each of the respective evacuated tubes (501). The working fluid travels from the inlet pipe (502) down through the u-tubes (503) within the evacuated tubes (501), becoming superheated in this process, and then circulates back out as a hotter gas which is then sent into an outlet pipe (504). The inlet pipe (502) and the outlet pipe (504) may be copper tubing of about one-half inch in diameter, but is not limited thereto, and the u-tubes (503) may be copper tubing of about three-eights inch in diameter, but is also not limited thereto.

By utilizing both the solar compressor (401) and the solar collector (402) in the solar air conditioning system (400), the load of heating the working fluid is shared between these two components (i.e., the solar compressor (401) and the solar collector (402)) depending on the amount of available solar energy. The load on and work done by the solar compressor (401) may be reduced using the free energy (i.e., solar energy utilized by the solar collector (402)) to increase the temperature delivered to the top of the coils in the condenser (403), and more heat removal (BTUs) capability is added via the additional volume of working fluid present in the solar air conditioning system (400).

According to an exemplary embodiment of the present invention, the inlet pipe (502), the outlet pipe (504), and upper portions of the u-tubes (503) and evacuated tubes (501) may be encased by an outer housing (505).

Figure 6:
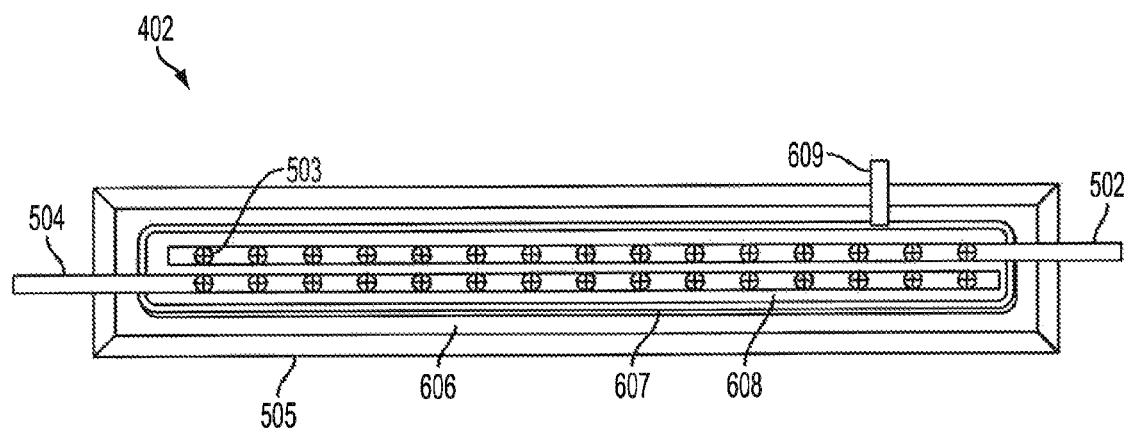
FIG. 6 is a cutaway view of the solar collector according to an exemplary embodiment of the present invention.

FIG. 6 is a cutaway view of the solar collector (402) according to an exemplary embodiment of the present invention. As shown in FIG. 6, an inner tank (607) is provided within the outer housing (505). The inner tank (607) further encloses the inlet pipe (502), the outlet pipe (504), and upper portions of the u-tubes (503) and evacuated tubes (501). The inner tank (607) may be filled with a heat transfer fluid (608) and configured to seal the heat transfer fluid (608) within, such that the heat transfer fluid (608) fills an interior space so as to surround the inlet pipe (502), the outlet pipe (504), and the u-tubes (503), and also fills the evacuated tubes (501).

According to an exemplary embodiment of the present invention, the inner tank (607) may be insulated using a material such as rock wool, but is not limited thereto, with insulation (606) filling a space between the inner tank (607) and the outer housing (505). Also, the heat transfer fluid (608) may be injected into the inner tank (607) by way of a heat transfer fluid fill hole (609).

Figure 7:
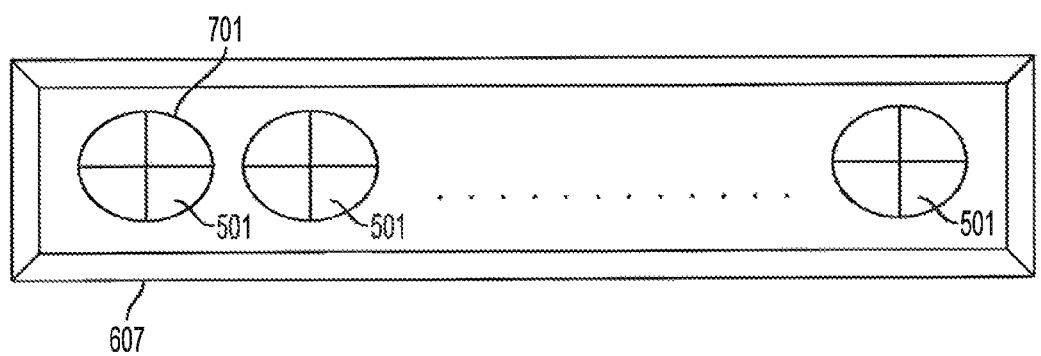
FIG. 7 is a bottom view of an inner tank of the solar collector according to an exemplary embodiment of the present invention.

FIG. 7 is a bottom view of the inner tank (607), according to an exemplary embodiment of the present invention. As shown in FIG. 7, the inner tank (607) includes holes (501) from which the u-tubes (503) extend out from the inlet pipe (502) and outlet pipe (504), and also through which the upper portion of the evacuated tubes (501) are inserted. The upper portions of the evacuated tubes (501) are the open ended sides of the evacuated tubes (501), and are inserted into the holes (501) and sealed by sealant rings (701). Upon injecting the heat transfer fluid (608) into the inner tank (607) by way of the heat transfer fluid fill hole (609), the heat transfer fluid (608) thus also freely enters and fills each of the evacuated tubes (501) as well as surrounds the u-tubes (503) and the inlet pipe (502) and outlet pipe (504).

In an exemplary embodiment of the present invention, the solar collector (402) may further include heat transfer fins (not shown) welded to a portion of each of the u-tubes (503). The heat transfer fins may circle and make contact with an inner glass tube (802) (see FIG. 8) of the evacuated tubes (501), or make contact with a selective coating of Al—N/Al applied to the inner glass tube (802) of the evacuated tubes (501). The heat transfer fins may be formed of a metal, such as aluminum, or any other substance with good heat transfer characteristics.

The heat transfer fluid (608) has a high boiling point, preferably at least 424° F., and more preferably between 525° F. and 800° F. The u-tubes (503) are immersed within the heat transfer fluid (608) enabling higher heat transfer efficiency. Heat from solar energy is transferred by the heat transfer fluid (608) through to the u-tubes (503), so as to superheat the working fluid flowing through the u-tubes (503).

According to an exemplary embodiment of the present invention, any number of evacuated tubes (501) may be used in constructing the solar collector (402). The larger the number of evacuated tubes (501), the more energy that may be collected and transferred to the working fluid. Also, the diameter and length of the evacuated tubes (501) may each be varied, with a larger surface area generally leading to more energy transferred to the working fluid within the u-tubes (503).

Figure 8:
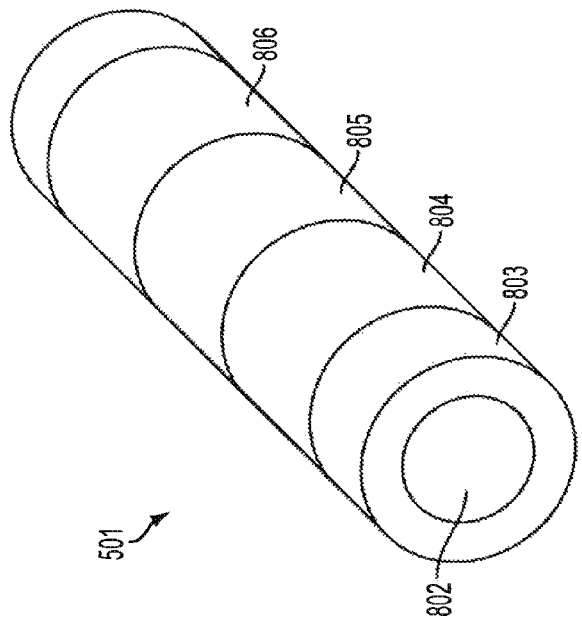
FIG. 8 is a detailed view of an evacuated tube according to an exemplary embodiment of the present invention.

FIG. 8 is a detailed view of the evacuated tube (501) according to an exemplary embodiment of the present invention. As shown in FIG. 8, the evacuated tube (501) is constructed as a double wall vacuum tube with a triple deposition selective surface coating. The evacuated tube (501) may be formed from two concentric transparent borosilicate glass tubes (Pyrex®), with the inner glass tube (802) that may be coated with the selective coating of Al—N/Al which absorbs and converts solar radiation and infrared light into heat while reducing emissivity. A barium getter is used at the bottom of the inner glass tube (802) and actively absorbs all CO, $CO^2$, $N^2$, $O^2$, and $H^2O$. The evacuated tube (501) may be formed as one continuous piece of glass.

Between the inner glass tube (802) and an outer glass tube (803), a multiple deposition selective surface may be formed to absorb the full visible and infrared light radiation wavelengths from 0.3 to 1.3μ. A first deposition layer (804) of the multiple deposition selective surface is a copper metal layer M-AL—N/CU which has a low emission ratio and a high thermal transmission through the inner glass tube (802) to the respective u-tube (503).

The multiple deposition selective surface includes a second deposition layer (805) of $AL^2O^3$ film to prevent cross migration. This entrainment allows the copper molecular layer (first deposition layer (804)) to be very stable at temperatures in excess of 750° F.

The multiple deposition selective surface also includes a third deposition layer (806) of a cermet aluminum nitride AL—N/M-AL—N, produced by sputtering simultaneously in a gas mixture of argon and nitrogen. The third deposition layer (806) absorbs solar radiation at very low emissivity (e.g., e=5%).

In another exemplary embodiment of the present invention, the heat transfer fluid (608) may include a chemical composition enabling absorption of the energy from the sun's radiation and converting this energy into heat. In a further exemplary embodiment of the present invention, evacuated tubes (501) may be provided without the Al—N/Al selective coating on the inner glass tube (802).

Figure 9:
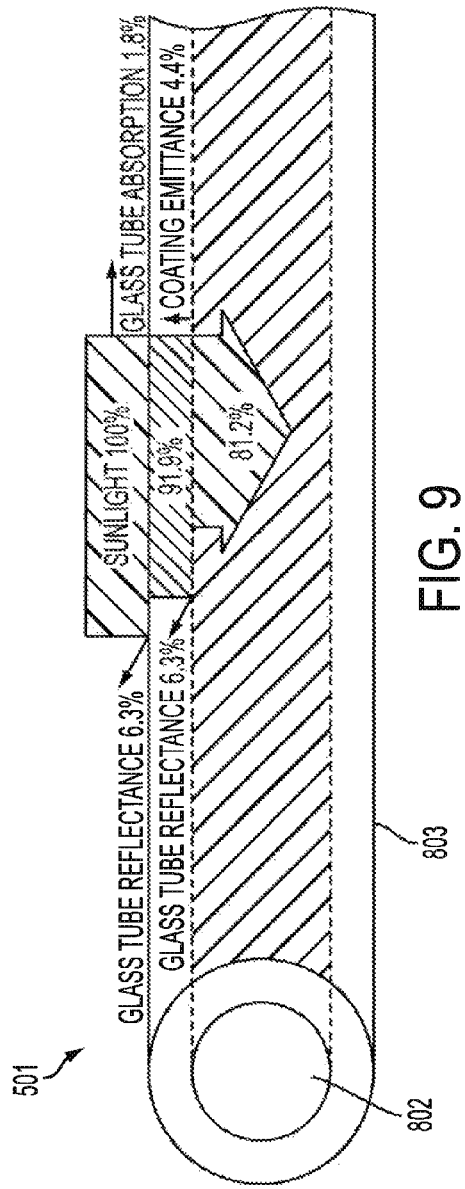
FIG. 9 is a diagram showing the reflectance, absorption and emittance rates of the sunlight entering an evacuated tube, according to an exemplary embodiment of the present invention.

FIG. 9 is a diagram showing the reflectance, absorption and emittance rates of the sunlight entering the evacuated tube (501) according to an exemplary embodiment of the present invention. As shown in FIG. 8, the sunlight strikes the outer glass tube (803), and of the sunlight striking the outer glass tube (803), 6.3% is reflected and 1.8% is absorbed, leaving 91.9% of the sunlight to strike the inner glass tube (802). Of the 91.9% of the sunlight striking the inner glass tube (802), another 6.3% is reflected and 4.4% is emitted due to coating emittance, leaving 81.2% of the sunlight to pass through to the inside of the evacuated tube (501).

When the evacuated tubes (501) receive solar radiation, the evacuated tubes (501) with their triple deposition selective surface coating enables heat to be generated and collected. This heat is transferred by the heat transfer fluid to the u-tubes (503) and absorbed by the working fluid flowing through the u-tubes (503). In such a way, the working fluid may be superheated before being provided to the condenser (403). The higher temperature of the working fluid entering the condenser (403) allows for a higher percentage of heat transfer due to the increase of $\Delta T$ between the superheated working fluid temperature and the outside ambient air temperature.

The foregoing exemplary embodiments and advantages are merely exemplary and are not to be construed as limiting the present invention. The present teaching can be readily applied to other types of apparatuses. Also, the description of exemplary embodiments of the present invention is intended to be illustrative, and not to limit the scope of the claims, and many alternatives, modifications, and variations will be apparent to those skilled in the art.

What is claimed is:

1. A cooling system comprising:
  a compressor configured to compress a working fluid;
  a solar collector coupled to said compressor, said solar collector configured to heat said working fluid to convert said working fluid into a gaseous state;
  a condenser coupled to said solar collector, said condenser configured to condense said heated working fluid; and
  an evaporator coupled between said condenser and said compressor, said evaporator configured to evaporate said condensed working fluid,
  wherein said solar collector comprises:
    at least one evacuated tube configured to heat said working fluid,
    wherein said working fluid is heated while present within an interior space of said at least one evacuated tube.

2. The cooling system of claim 1, wherein said solar collector heats said working fluid using radiant energy from the sun.

3. The cooling system of claim 1, wherein said solar collector further comprises:
  an inlet pipe that receives said working fluid;
  at least one u-tube that is configured to receive at a first end said working fluid from said inlet pipe;
  an outlet pipe that is configured to receive said working fluid from a second end of said at least one u-tube,
  wherein said at least one u-tube is further configured to extend within the interior space of said at least one evacuated tube.

4. The cooling system of claim 3, wherein said solar collector comprises a plurality of u-tubes and a plurality of evacuated tubes, wherein each u-tube of said plurality of u-tubes is configured to receive said working fluid from said inlet pipe, and wherein each u-tube of said plurality of u-tubes is further configured to extend within a corresponding evacuated tube of said plurality of evacuated tubes.

5. The cooling system of claim 4, wherein said working fluid flows from said inlet pipe into said first end of said at least one u-tube and exits said at least one u-tube from said second end and flows into said outlet pipe.

6. The cooling system of claim 3, wherein said working fluid travels through said at least one u-tube, is heated using radiant energy collected by said evacuated tubes, then circulates out from said at least one u-tube in the superheated gaseous state, and is then delivered into said outlet pipe.

7. The cooling system of claim 3, wherein said solar collector further comprises an inner tank, and wherein said inlet pipe and said outlet pipe are housed within said inner tank.

8. The cooling system of claim 7, wherein said inner tank comprises at least one hole through which said at least one u-tube extends out from said inlet pipe and said outlet pipe, and wherein an upper portion of an open ended side of said at least one evacuated tube is inserted into said at least one hole.

9. The cooling system of claim 8, wherein said inner tank and the interior space of said at least one evacuated tube is filled with a heat transfer fluid, wherein said at least one u-tube is submerged in said heat transfer fluid, and wherein said heat transfer fluid is sealed within an enclosure formed of said inner tank in combination with said at least one evacuated tube inserted into said at least one hole of said inner tank.

10. The cooling system of claim 7, wherein said solar collector further comprises:
  an insulating material that surrounds said inner tank; and
  an outer housing that encloses said inner tank and said insulating material.

11. The cooling system of claim 3, wherein said solar collector further comprises a heat transfer fluid that fills the interior space of said at least one evacuated tube and within which said at least one u-tube is submerged.

12. The cooling system of claim 11, wherein said heat transfer fluid absorbs radiant energy from the sun, converts the radiant energy into heat, and transfers the heat to said working fluid.

13. The cooling system of claim 12, wherein said heat transfer fluid has a boiling point of at least 424° F.

14. The cooling system of claim 3, wherein said solar collector further comprises at least one heat transfer fin attached to a portion of said at least one u-tube.

15. The cooling system of claim 14, wherein said at least one heat transfer fin contacts an inside wall of said at least one evacuated tube.

16. The cooling system of claim 14, wherein said at least one heat transfer fin protrudes from said at least one u-tube and contacts a selective coating applied to an inner surface of said at least one evacuated tube.

17. The cooling system of claim 16, wherein said selective coating comprises Al—N/AL and enables said at least one evacuated tube to absorb and convert radiant energy into heat.

18. The cooling system of claim 1, wherein said at least one evacuated tube is a double wall vacuum tube comprising a triple deposition selective surface coating.

19. The cooling system of claim 1, wherein said at least one evacuated tube receives radiant energy from the sun, generates heat from the radiant energy, and transfers the heat through a heat transfer fluid to said working fluid flowing within the interior space of said at least one evacuated tube.

20. A method of circulating a working fluid in a closed loop within a cooling system, the method comprising:
  compressing said working fluid by applying pressure to said working fluid to pack molecules of said working fluid closer together;
  heating said compressed working fluid using radiant energy from the sun, wherein said compressed working fluid is heated within an evacuated tube that converts the radiant energy into heat for heating said compressed working fluid while said working fluid is present within an interior space of said evacuated tube;

condensing said heated working fluid by cooling and changing a state of said heated working fluid from a gas into a liquid; and evaporating said condensed working fluid by changing a state of said condensed working fluid from a liquid into a gas.

\* \* \* \* \*